United States Patent Office 3,117,104
Patented Jan. 7, 1964

3,117,104
STABILIZATION OF POLYOLEFINS
Delos E. Bown and Richard T. Moravek, Baytown, Tex., assignors, by mesne assignments, to Esso Research and Engineering Company, Elizabeth, N.J., a corporation of Delaware
No Drawing. Filed June 29, 1961, Ser. No. 120,473
20 Claims. (Cl. 260—45.9)

The present invention is directed to a polyolefin composition. More particularly, the invention is concerned with a composition including polyolefins which is stable against heat and color degradation when in contact with a metal or when it contains a metal contaminant. In its more specific aspects, the invention is concerned with a composition of a polyolefin, such as polypropylene, which does not deteriorate or exhibit discoloration when contaminated with a small amount of a metal contaminant.

The present invention may be briefly described as a stable composition which comprises a major amount of a solid polymer of an alpha olefin having 2 to 8 carbon atoms in the molecule and a minor but effective amount of an oxaldihydrazide having the formula

O=C—NH—NHR
|
O=C—NH—NHR where R is selected from the alkyl radicals having 1 to 16 carbon atoms, the mono-aryl radicals and the naphthene radicals having 5 to 12 carbon atoms. The composition also may include a costabilizer.

The polyolefin polymers in accordance with the present invention are polymers of olefins having 2 to 8 carbon atoms in the molecule and may suitably be exemplified by polyethylene, polypropylene, ethylene-propylene copolymers, ethylene-butene-1 copolymers, ethylene-pentene-1 copolymers and the like having molecular weights in the range from about 10,000 to about 1,000,000. These polymers are produced by polymerization of the corresponding olefins employing the Ziegler type polymerization catalst which is obtained by at least partially reducing in solution in a diluent a halide of an amphoteric metal selected from groups IVB, VB, VIB, and VIII of the periodic system of elements (see, for example, the Henry D. Hubbard Periodic Chart of the Elements, 1947 Ed., revised by W. F. Meegers; W. M. Welch Mfg. Co., Chicago, Ill.). Examples of suitable halides from which the catalyst is prepared are the halides of titanium, zirconium, hafnium, thorium, uranium, vanadium, columbium, tantalum, chromium, molybdenum, tungsten, and mixtures thereof. Exemplary of suitable compounds include titanium tetrachloride, titanium tetrabromide, zirconium tetrachloride, and the like.

In preparing catalyst suitable for use in forming the polymer treated in accordance with the present invention, the amphoteric metal halide is reduced in solution in a nonreactive, nonpolar organic diluent in any suitable manner such as by means of chemical reaction with a suitable chemical compound having reducing properties, by irradiation, etc. This is done to reduce at least a portion, and preferably more than about 30 percent of the amphoteric metal halide, to a lower valence state. The product of the reduction step, comprising the diluent and the at least partially reduced amphoteric metal halide, is employed as the medium in which olefin polymerization is effected.

The diluent to be employed should be a non-reactive, nonpolar organic medium in which the amphoteric metal halide starting material is soluble to an extent at least sufficient to provide an 0.1 weight percent solution of amphoteric metal halide starting material. Thus, for example, in preparing the polymerization medium, an 0.1 to 10 weight percent solution of amphoteric metal halide in the diluent may be employed.

Among the diluents that may be employed are saturated aliphatic hydrocarbons, preferably containing from about 5 to 10 carbon atoms per molecule. Specific examples of such diluents include pentane, hexane, heptane, octane, decane, nonane, and mixtures thereof, or other saturated petroleum hydrocarbons. A particularly desirable diluent is n-heptane. It will be understood that other hydrocarbon diluents may be used, such as aromatic diluents (benzene, xylene, etc.), halogenated aromatic hydrocarbons (monochlorobenzene, dichlorobenzene, etc.), gas oil distillate fractions obtained from the catalytic cracking of virgin gas oil feed stocks, diesel oil, etc. It will be understood that, if desired, mixtures of two or more compatible, miscible diluents may be employed. The diluent should be substantially completely free from oxygen, water, and similar compounds of strong polarity which are reactive with the products obtained by reduction of the amphoteric metal halide.

The nonpolar organic liquid in which the slurry is formed may suitably be identical with the diluent in which the catalyst is formed for polymerizing the olefinic compounds.

The polymerization reaction is suitably conducted at a temperature in the range from about —60° to about 400° F., preferably at about room temperature. Higher temperatures may be employed, but are generally undesirable in that catalyst decomposition may be encountered. Subatmospheric pressures and pressures up to about 250 atmospheres may be employed in forming the polymer treated in accordance with the present invention. It is generally preferable to employ in the polymerization technique a comparatively low pressure, and specifically it is desirable to employ atmospheric pressure. Reaction times of about 60 minutes are required, although reaction time may vary within the range of about 10 minutes to about 24 hours.

As a result of subjecting the olefins of the type illustrated before to treatment with a catalyst of the nature described, olefin polymers are formed having the molecular weights recited which are essentially insoluble in the nonpolar organic liquid and form a slurry of polymerized olefins in the nonpolar organic liquid. It is these polymers, after quenching to deactivate any catalyst and separation from the slurry, which are treated by adding the additives, in accordance with the present invention; otherwise the polymer in contact with a metal contaminant such as copper, and the like, may rapidly degrade.

The oxaldihydrazides employed in the present invention are preferably oxaldihydrazide and bis-cyclohexanone-oxaldihydrazide as illustrated by the following formulas:

O=C—NH—NH₂
|
O=C—NH—NH₂

I

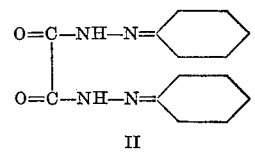

II

While these compounds have been shown to give desirable results, other oxaldihydrazides may be used. As typical examples of the oxaldihydrazides may be mentioned the following:

O=C—NH—N(CH₃)₂
|
O=C—NH—N(CH₃)₂

Tetramethyloxaldihydrazide

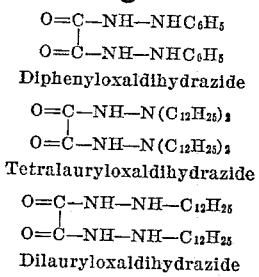

O=C—NH—NHC$_6$H$_5$
|
O=C—NH—NHC$_6$H$_5$

Diphenyloxaldihydrazide

O=C—NH—N(C$_{12}$H$_{25}$)$_2$
|
O=C—NH—N(C$_{12}$H$_{25}$)$_2$

Tetralauryloxaldihydrazide

O=C—NH—NH—C$_{12}$H$_{25}$
|
O=C—NH—NH—C$_{12}$H$_{25}$

Dilauryloxaldihydrazide present invention are quite useful in alleviating this problem and especially are useful in insulation of copper wires which are used as electrical conductors.

In order to illustrate the present invention further, a number of compositions were made up wherein certain compounds known in the prior art as deactivators of metals were added to polypropylene and compared with the compounds of the present invention. The result shown in the following Table I compares the commercial-type metal deactivators with the compounds of the present invention in polypropylene.

TABLE I

*Oxidative Stability of Polypropylene—Effect of Copper and Copper Deactivators*

| Sample Number | Stabilizer System [a] | Wt. Percent | p.p.m. Cu (as CuCl$_2$) | Color of Pad | Oxidative Stability, Days [b] |
|---|---|---|---|---|---|
| 1 | DLTDP [d] dipinene-diphenol | 0.3, 0.1 | None | Off White | 68 |
| 2 | do | 0.3, 0.1 | 20 | do | 2 |
| 3 | DLTDP [d] dipinene-diphenol Du Pont Deactivator [c] | 0.3, 0.1, 0.05 | 20 | Light Brown | 3 |
| 4 | DLTDP [d] dipinene-diphenol UOP Deactivator [c] | 0.3, 0.1, 0.05 | 20 | do | 4 |
| 5 | DLTDP [d] dipinene-diphenol p-Dimethylaminobenzal Rhodanine | 0.3, 0.1, 0.05 | 20 | Dark Red | 3 |
| 6 | DLTDP [d] dipinene-diphenol Dithioxamide | 0.3, 0.1, 0.05 | 20 | Brown | 3 |
| 7 | DLTDP [d] dipinene-diphenol Phthalonitrile | 0.3, 0.1, 0.05 | 20 | Lt. Yellow | 2 |
| 8 | DLTDP [d] dipinene-diphenol Benzoin α-oxime | 0.3, 0.1, 0.05 | 20 | do | 1 |
| 9 | DLTDP [d] dipinene-diphenol Dimethylglyoxime | 0.3, 0.1, 0.05 | 20 | Yellow | 6 |
| 10 | DLTDP [d] dipinene-diphenol Compound II | 0.3, 0.1, 0.05 | 20 | Lt. Yellow | 17 |
| 11 | DLTDP [d] dipinene-diphenol Compound I | 0.3, 0.1, 0.05 | 20 | Off White | 16 |

[a] Polypropylene.
[b] 303° F., 10 cc. air/min.
[c] N,N'-Disalicylidene-1,2-diaminopropane.
[d] Dilaurylthiodipropionate.

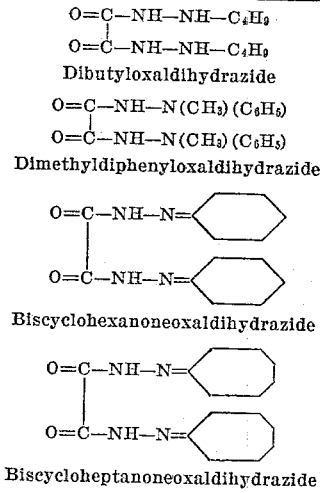

O=C—NH—NH—C$_4$H$_9$
|
O=C—NH—NH—C$_4$H$_9$

Dibutyloxaldihydrazide

O=C—NH—N(CH$_3$)(C$_6$H$_5$)
|
O=C—NH—N(CH$_3$)(C$_6$H$_5$)

Dimethyldiphenyloxaldihydrazide

O=C—NH—N=⬡
|
O=C—NH—N=⬡

Biscyclohexanoneoxaldihydrazide

O=C—NH—N=⬡
|
O=C—NH—N=⬡

Biscycloheptanoneoxaldihydrazide

The present invention has particular utility in contact with metals which cause the polyolefins to deteriorate by oxidation. Certain salts of multivalent metals as well as the free metals themselves promote the oxidative degradation of polymers of alpha olefins having 2 to 8 carbon atoms in the molecule such as polypropylene. The deterioration in quality is evidenced by molecular weight breakdown and the formation of undesirable color, odor, and insoluble residues. The metals which are most flagrant in contaminating polyolefins are copper, cobalt, manganese, iron, nickel and chromium. Copper is by far the most active with one p.p.m. being sufficient to contaminate the polyolefin, such as polypropylene, and cause it to deteriorate in quality. Usually the contaminating metal will be present in amounts no greater than about 20 p.p.m. and may be as little as 0.5 p.p.m. The problem is quite serious when the polyolefin, such as polypropylene, is used for insulation of metals, particularly in wires where the polyolefin is an electrical insulator. The polyolefins which are stabilized in accordance with the These data in Table I show that the comercial deactivators are ineffective in overcoming the deleterious effects of 20 p.p.m. of copper. Ordinarily the polypropylene will not contain as much as 20 p.p.m. and may contain a lesser amount, for example, in the range from about 1 to about 5 p.p.m. In short, the test results are accelerated; and the Compounds I and II added to polypropylene show beneficial results in offsetting the deleterious effects of the 20 p.p.m. of copper. It is to be noted that the composition of the present invention is many-fold better in color and oxidative stability than the compositions of the prior art.

The dipinene-diphenol is a resinous material with the pinene and phenol being present in a ratio of about 1:1. The dipinene-diphenol has a molecular weight in the range from about 450 to about 550 and may be represented by the formula: $(C_{10}H_{16})_2(C_6H_5OH)_2$. The dipinene-diphenol is produced by reacting 1 mole of pinene and 1 mole of phenol in the presence of boron trifluoride etherate as a catalyst at a temperature from about 70° to about 122° F. to form the resinous dipinene-diphenol product. In preparing the dipinene-diphenol, a mixture of α and β-pinene and a benzene solution of phenol is reacted. The product is washed with hot water to remove catalyst and unreacted material. Thereafter, the washed product is dried, filtered, and then distilled to remove benzene and any light fractions. The material remaining is the dipinene-diphenol. The dipinene-diphenol has a ring and ball melting point in the range of about 75° to about 150° C. and is completely soluble in methanol.

Other stabilizers may be used and, for example, compounds such as ditridecyl thiodipropionate, distearyl thiodipropionate, dicetyl sulfide, bis(tetradecylmercapto)-p-xylylene, bis(octadecylmercapto)-p-xylene, bis(tetradecylmercapto) hexahydro-p-xylene, 19,25-dithiabentetetracontane, and 19,24-dithiatetra-contane, and the like, may be used as costabilizers. It will be preferred however, to use dipinene-diphenol and dilaurylthiodipropionate as costabilizers in the composition of the present invention.

While the composition of the present invention is most useful as an electrical insulation, it is also useful in any operation where the polyolefin is in contact with a metal which wall cause oxidative degradation thereto. In short, the polyolefin may be used in molding articles and as filaments, fibers for weaving cloth, rope making, and in many other uses.

In adding the oxaldihydrazides and the other additives to the polyolefin, the additives may be suitably employed and incorporated in the polyolefin by forming a solution of the particular additive in a suitable solvent, such as aromatic hydrocarbon. The dipinene-diphenol may suitably be added in a solvent, such as methanol, xylene, hexane and the like, while the other stabilizers may suitably be employed in a solvent such as methanol, xylene, hexane, and the like. The various additives may be sprayed over the pellets or particles of polymers and the resulting mixture may then be extruded through a suitable extrusion device to cause the formation of a homogeneous mixture. While it is preferred to add the several additives to the polyolefin in a solution, they may suitably be added as such to the polymer particles and the resulting mixture subjected to milling or extrusion, as desired, to cause intimate admixture of the additives with the polymer composition to form a homogeneous mixture.

The nature and objects of the present invention having been fully described and illustrated and the best mode thereof set forth, what we wish to claim as new and useful and secure by Letters Patent is:

1. A stable composition which comprises a major amount of a solid polymer of an alpha olefin having 2 to 8 carbon atoms in the molecule containing a contaminating amount of a multivalent metal tending to promote oxidation and a minor amount effective to counteract the adverse effect of said metal of an oxaldihydrazide having the formula:

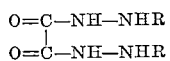

where R is a member selected from the group consisting of the alkyl radicals having 1 to 16 carbon atoms, the mono-aryl radicals, and the naphthene radicals having 5 to 12 carbon atoms, and a costabilizer selected from the group consisting of dipinene-diphenol, dilaurylthiodipropionate, dictridecyl thiodipropionate, distearyl thiodipropionate, dicetyl sulfide, bis(tetradecylmercapto)-p-xylylene, bis(octadecylmercapto)-p-xylylene, bis(tetradecylmercapto) hexahydro-p-xylylene, 19, 25-dithiahentetracontane, and 19,24-dithiatetracontane.

2. A composition in accordance with claim 1 in which the polymer is polyethylene.

3. A composition in accordance with claim 1 in which the polymer is polypropylene.

4. A stable composition which comprises a major amount of a solid polymer of an alpha olefin having 2 to 8 carbon atoms in the molecule containing a contaminating amount of a multivalent metal tending to promote oxidation and minor amount effective to counteract the adverse effect of said metal within the range from about 0.01 to about 1.0° by weight based on the polymer of an oxaldihydrazide having the formula:

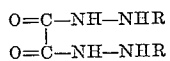

where R is a member selected from the group consisting of the alkyl radicals having 1 to 16 carbon atoms, the mono-aryl radicals, and the naphthene radicals having 5 to 12 carbon atoms, and a costabilizer selected from the group consisting of dipinene-diphenol, dilaurylthiodipropionate, ditridecyl thiodipropionate, distearyl thiodipropionate, dicetyl sulfide, bis(tetradecylmercapto)-p-xylylene, bis(octadecylmercapto)-p-xylylene, bis(tetradecylmercapto) hexahydro-p-xylylene, 19,25-dithiahentetracontane, and 19,24-dithiatetracontane.

5. A stable composition which comprises a major amount of a solid polymer of an alpha olefin having 2 to 8 carbon atoms in the molecule containing a contaminating amount of a multivalent metal tending to promote oxidation and a minor amount effective to counteract the adverse effect of said metal of an oxaldihydrazide having the formula:

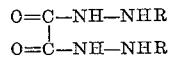

where R is a member selected from the group consisting of the alkyl radicals having 1 to 16 carbon atoms, the mono-aryl radicals, and the naphthene radicals having 5 to 12 carbon atoms, and dilaurylthiodipropionate.

6. A stable composition which comprises a major amount of a solid polymer of an alpha olefin having 2 to 8 carbon atoms in the molecule containing a contaminating amount of a multivalent metal tending to promote oxidation and a minor amount effective to counteract the adverse effect of said metal of an oxaldihydrazide having the formula:

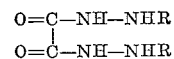

where R is a member selected from the group consisting of the alkyl radicals having 1 to 16 carbon atoms, the mono-aryl radicals, and the naphthene radicals having 5 to 12 carbon atoms, and dipinene-diphenol.

7. A stable composition which comprises a major amount of a solid polymer of an alpha olefin having 2 to 8 carbon atoms in the molecule containing a contaminating amount of a multivalent metal tending to promote oxidation and minor amount effective to counteract the adverse effect of said metal of an oxaldihydrazide having the formula:

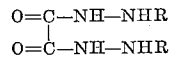

where R is a member selected from the group consisting of the alkyl radicals having 1 to 16 carbon atoms, the mono-aryl radicals, and the naphthene radicals having 5 to 12 carbon atoms, and dilaurylthiodipropionate and dipinene-diphenol.

8. A composition in accordance with claim 7 in which the oxaldihydrazide and the dilaurylthiodipropionate and dipinene-diphenol each are present in an amount within the range from about 0.05 to about 1.0% by weight based on the polymer.

9. A composition in accordance with claim 7 in which the polymer is polypropylene.

10. A stable composition which comprises a major amount of a solid polymer of an alpha olefin having 2 to 8 carbon atoms in the molecule containing a contaminating amount of copper tending to promote oxidation and a minor amount effective to counteract the adverse effect of said copper of an oxaldihydrazide having the formula:

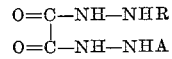

where R is a member selected from the group consisting of the alkyl radicals having 1 to 16 carbon atoms, the mono-aryl radicals and the naphthene radicals having 5 to 12 carbon atoms, and a costabilizer selected from the group consisting of dipinene-diphenol, dilaurylthiodipropionate, ditridecyl thiodipropionate, distearyl thiodipropionate, dicetyl sulfide, bis(tetradecylmercapto)-p-xylylene, bis(octadecylmercapto)-p-xylylene, bis(tetradecylmercapto) hexahydro-p-xylylene, 19,25-dithiahentetracontane, and 19,24-dithiatetracontane.

11. A composition in accordance with claim 10 in which the amount of copper is less than 20 p.p.m.

12. A composition in accordance with claim 10 in which the polymer is polypropylene.

13. A stable composition which comprises a major amount of a solid polymer of propylene containing a contaminating amount of copper tending to promote oxidation and a minor amount effective to counteract the adverse effect of said copper within the range from about 0.01% to about 1.0% by weight based on the polymer of an oxaldihydrazide having the formula:

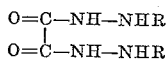

where R is a member selected from the group consisting of the alkyl radicals having 1 to 16 carbon atoms, the mono-aryl radicals, and the naphthene radicals having 5 to 12 carbon atoms and at least one costabilizer selected from the group consisting of dipinene-diphenol, dilauryl-thiodipropionate, ditridecyl thiodipropionate, distearyl thiodipropionate, dicetyl sulfide, bis(tetradecylmercapto)-p-xylylene, bis(octadecylmercapto)-p-xylylene, bis(tetradecylmercapto) hexahydro-p-xylylene, 19,25-dithiahentetetracontane, and 19,24-dithiatetracontane.

14. A stable composition which comprises a major amount of a solid polymer of propylene containing a contaminating amount less than 20 p.p.m. of a contaminating multivalent metal tending to promote oxidation and a minor amount effective to counteract the adverse effect of said metal within the range from about 0.01 to 1.0% by weight based on the polymer of an oxaldihydrazide having the formula:

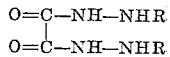

where R is a member selected from the group consisting of the alkyl radicals having 1 to 16 carbon atoms the mono-aryl radicals, and the naphthene radicals having 5 to 12 carbon atoms and a costabilizer selected from the group consisting of dipinene-diphenol, dilaurylthiodipropionate, ditridecyl thiodipropionate, distearyl thiodipropionate, dicetyl sulfide, bis(tetradecylmercapto)-p-xylylene, bis(octadecylmercapto)-p-xylylene, bis(tetradecylmercapto) hexahydro-p-xylylene, 19,25-dithiahentetetracontane, and 19,24-dithiatetracontane.

15. A composition in accordance with claim 14 in which the metal is copper.

16. A stable composition which comprises a major amount of a solid polymer of propylene containing a contaminating amount less than 20 p.p.m. of cobalt tending to promote oxidation and a minor amount effective to counteract the adverse effect of said cobalt within the range from about 0.01 to 1.0% by weight based on the polymer of an oxaldihydrazide having the formula:

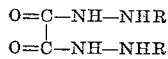

where R is a member selected from the group consisting of the alkyl radicals having 1 to 16 carbon atoms, the mono-aryl radicals, and the naphthene radicals having 5 to 12 carbon atoms and a costabilizer selected from the group consisting of dipinene-diphenol, dilaurylthiodipropionate, ditridecyl thiodipropionate, distearyl thiodipropionate, dicetyl sulfide, bis(tetradecylmercapto)-p-xylylene, bis(octadecylmercapto)-p-xylylene, bis(tetradecylmercapto) hexahydro-p-xylylene, 19,25-dithiahentetetracontane, and 19,24-dithiatetracontane.

17. A stable composition which comprises a major amount of a solid polymer of propylene containing a contaminating amount less than 20 p.p.m. of manganese tending to promote oxidation and a minor amount effective to counteract the adverse effect of said manganese within the range from about 0.01 to 1.0% by weight based on the polymer of an oxaldihydrazide having the formula:

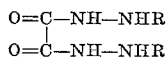

where R is a member selected from the group consisting of the alkyl radicals having 1 to 16 carbon atoms, the mono-aryl radicals, and the naphthene radicals having 5 to 12 carbon atoms and a costabilizer selected from the group consisting of dipinene-diphenol, dilaurylthiodipropionate, ditridecyl thiodipropionate, distearyl thiodipropionate, dicetyl sulfide, bis(tetradecylmercapto)-p-xylylene, bis(octadecylmercapto)p-xylylene, bis(tetradecylmercapto) hexahydro-p-xylylene, 19,25-dithiahentetracontane, and 19,24-dithiatetracontane.

18. A stable composition which comprises a major amount of a solid polymer of propylene containing a contaminating amount less than 20 p.p.m. of iron tending to promote oxidation and a minor amount effective to counteract the adverse effect of said iron within the range from about 0.01 to 1.0% by weight based on the polymer of an oxaldihydrazide having the formula:

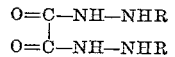

where R is a member selected from the group consisting of the alkyl radicals having 1 to 16 carbon atoms, the mono-aryl radicals, and the naphthene radicals having from 5 to 12 carbon atoms and a costabilizer selected from the group consisting of dipinene-diphenol, dilauryl-thiodipropionate, ditridecyl thiodipropionate, distearyl thiodipropionate, dicetyl sulfide, bis(tetradecylmercapto)-p-xylylene, bis(octadecylmercapto)-p-xylylene, bis(tetradecylmercapto) hexahydro-p-xylylene, 19,25-dithiahentetetracontane, and 19,24-dithiatetracontane.

19. A stable composition which comprises a major amount of a solid polymer of propylene containing a contaminating amount less than 20 p.p.m. of nickel tending to promote oxidation and minor amount effective to counteract the adverse effect of said nickel within the range from about 0.01 to 1.0% by weight based on the polymer of an oxaldihydrazide having the formula:

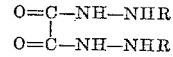

where R is a member selected from the group consisting of the alkyl radicals having 1 to 16 carbon atoms, the mono-aryl radicals, and the naphthene radicals having 5 to 12 carbon atoms, and a costabilizer selected from the group consisting of dipinene-diphenol, dilaurylthiodipropionate, ditridecyl thiodipropionate, distearyl thiodipropionate, dicetyl sulfide, bis(tetradecylmercapto)-p-xylylene, bis(octadecylmercapto)-p-xylylene, bis(tetradecylmercapto) hexahydro-p-xylylene, 19,25-dithiahentetetracontane, and 19,24-dithiatetracontane.

20. A stable composition which comprises a major amount of a solid polymer of propylene containing a contaminating amount less than 20 p.p.m. of chromium tending to promote oxidation and a minor amount effective to counteract the adverse effect of said chromium within the range from about 0.01 to 1.0% by weight based on the polymer of an oxaldihydrazide having the formula:

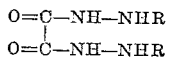

where R is a member selected from the group consisting of the alkyl radicals having 1 to 16 carbon atoms, the mono-aryl radicals, and the naphthene radicals having 5 to 12 carbon atoms and a costabilizer selected from the group consisting of dipinene-diphenol, dilaurylthiodipropionate, ditridecyl thiodipropionate, distearyl thiodipropionate, dicetyl sulfide, bis(tetradecylmercapto)-p-xylylene, bis(octadecylmercapto)-p-xylylene, bis(tetradecylmercapto) hexahydro-p-xylylene, 19,25-dithiahentetetracontane, and 19,24-dithiatetracontane.

References Cited in the file of this patent

UNITED STATES PATENTS

| | | |
|---|---|---|
| 2,956,982 | McCall et al. | Oct. 18, 1960 |
| 3,027,408 | Szmuszkovicz | Mar. 27, 1962 |